Sept. 10, 1929.   L. S. FORD   1,727,971
ELECTRICAL CABLE
Filed Nov. 30, 1923     2 Sheets-Sheet 1
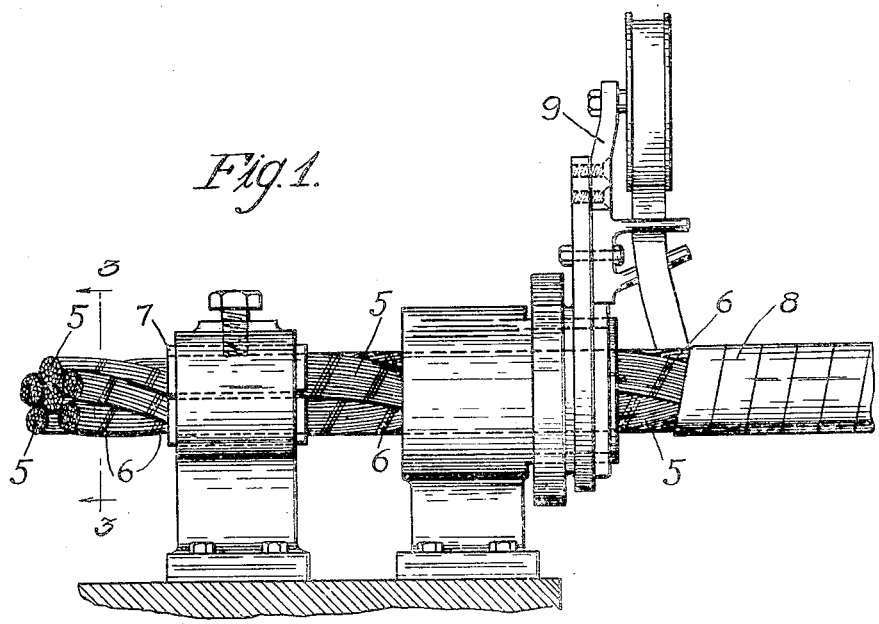
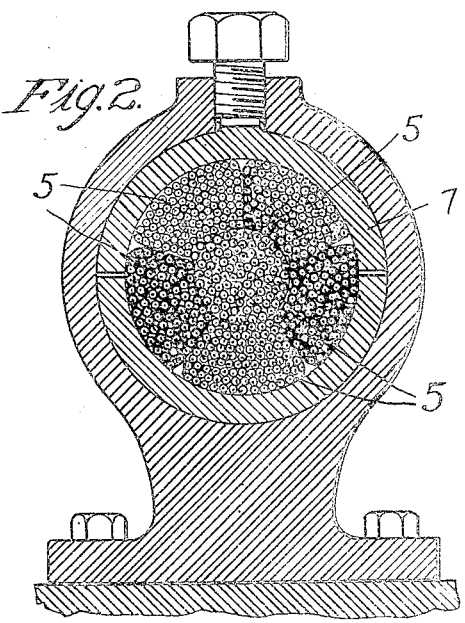
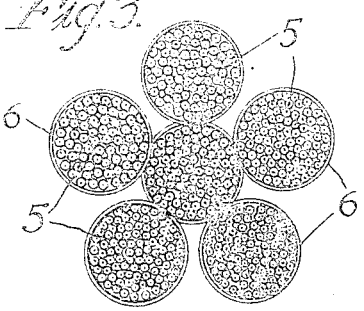
Inventor
Leroy S. Ford Sept. 10, 1929.   L. S. FORD   1,727,971
ELECTRICAL CABLE
Filed Nov. 30, 1923   2 Sheets-Sheet 2
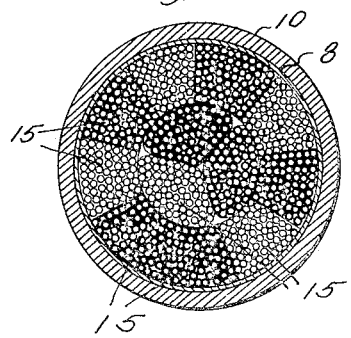
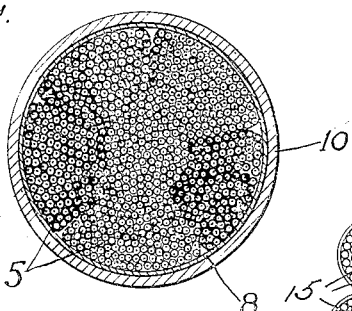
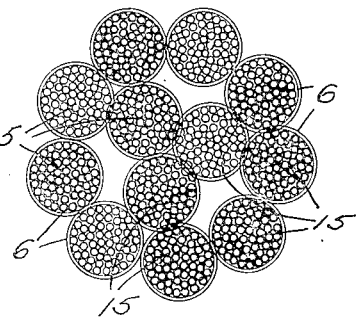
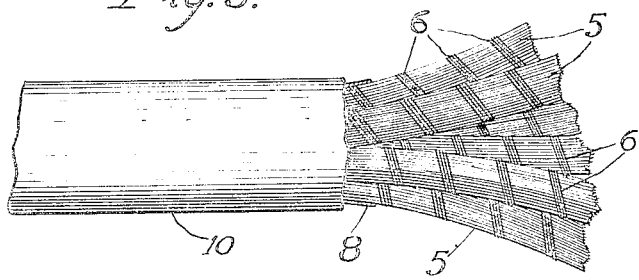
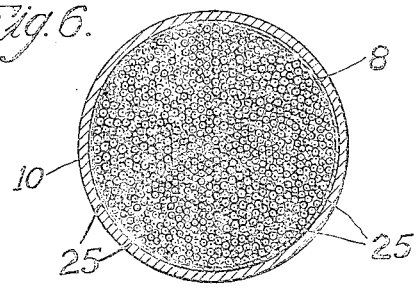
Inventor
Leroy S. Ford
by J. H. Pattison
Atty.

Patented Sept. 10, 1929.

1,727,971

UNITED STATES PATENT OFFICE.

LEROY STEARNS FORD, OF RIVER FOREST, ILLINOIS, ASSIGNOR TO WESTERN ELECTRIC COMPANY, INCORPORATED, OF NEW YORK, N. Y., A CORPORATION OF NEW YORK.

ELECTRICAL CABLE.

Application filed November 30, 1923. Serial No. 677,873.

This invention relates to improvements in electrical cables, particularly to the type employed for telephonic communication, together with a method of making the same.

Subscribers in city districts are in the modern telephone plant connected to the central office through lead covered cables of either the aerial or underground type. In a typical connection the subscriber's telephone set is connected by means of a twisted pair of rubber insulated drop wires with a sealed chamber type of terminal located near the subscriber's house. The sealed chamber is provided with means for connecting several subscribers' pairs to it. From these terminals, connection is made to the main underground or aerial cable system by means of small lead covered cables known as "block" cables. A number of these block cables bridge into the main aerial or underground cable which enters the central office. The block and main aerial or underground cables are of the paper insulated, dry core, lead covered type. At the central office it is necessary to connect the paper insulated conductor wires of the main cable with wires suitably insulated with silk, cotton, wool, or some other suitable insulating material so that they may be handled in connecting them to the terminals on what is termed a "main frame" located in the central office. These connecting cables between the paper insulated underground cable and the main frame are known as tips or terminating cables. The larger aerial or underground paper insulated cables connecting the subscriber to the central office consist of a large number of lines ranging from 606 to 1212 actual pairs.

It is necessary, of course, to know each subscriber's number at the central office. It would be impractical to attempt to associate these large subscriber cables each pair with its terminal number on the "main frame" throughout the entire circuit length by means of identification marks or colors. As a consequence the pairs in all of these large cables are separated into groups of pairs by definite color combinations. For instance, a 606 pair paper cable has six distinct color groups of 101 pairs each. Starting at the center, a core is formed of the first 101 pairs, one conductor of each pair being insulated with one color of paper and the other conductor of a pair being insulated with a different color, as, for instance, one wire having an insulation of white paper and the other wire of red paper. Around this central core of red and white pairs are stranded in concentric layers a second group which may be colored blue and white. A third group may be colored orange and white, etc. As the factory lengths of such cables are joined together in the field, like color groups are always spliced together so that from end to end of long cables the pairs are definitely separated into finite groups. Each group is given a definite group of pair numbers as, for instance, the red-white group is given numbers from 1 to 101 inclusive, the blue-white group 102 to 202 inclusive, etc., and in locating an individual pair it is only necessary to ring out the pairs of the group in which the sought number is located.

With the type of subscriber's paper insulated cable above described the groups are arranged in concentric layers, and since each layer or series of layers constituting a group does not always contain the proper number of pairs to complete a layer, a layer may contain the last pairs of one group and the first pairs of the next group. As a consequence, although the individual subscriber's lines are arranged in groups in the cable, these groups are not entirely separate and to this extent are not always well defined. Furthermore, in order to collect like colored pairs into a unit group or bunch, it is necessary, except for the central group, to divide the layers and pass the pairs around the central core to one side of the cable, resulting in an unhandy and awkward arrangement in splicing and terminating the cable.

An object of this invention is to provide a cable, particularly of the type employed for telephonic communication, consisting of a plurality of individually insulated conductors arranged in well defined strands or groups, the insulation of conductors in adjacent groups being in contact,